(12) United States Patent
Lee et al.

(10) Patent No.: US 8,351,977 B2
(45) Date of Patent: Jan. 8, 2013

(54) METHOD FOR PERFORMING DOWNLINK/UPLINK HANDOVER

(75) Inventors: Jin Lee, Gyeonggi-do (KR); Yong Ho Kim, Gyeonggi-do (KR); Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 381 days.

(21) Appl. No.: 12/665,672

(22) PCT Filed: Apr. 24, 2008

(86) PCT No.: PCT/KR2008/002330
§ 371 (c)(1),
(2), (4) Date: Dec. 18, 2009

(87) PCT Pub. No.: WO2008/156246
PCT Pub. Date: Dec. 24, 2008

(65) Prior Publication Data
US 2010/0323749 A1    Dec. 23, 2010

(30) Foreign Application Priority Data
Jun. 18, 2007  (KR) .................. 10-2007-0059361

(51) Int. Cl.
*H04W 36/30*    (2009.01)
(52) U.S. Cl. .................. 455/524; 370/329; 455/501

(58) Field of Classification Search .................. 455/436, 455/452.2; 370/329, 338, 331, 252
See application file for complete search history.

(56) References Cited

U.S. PATENT DOCUMENTS

| 2006/0276189 A1 | 12/2006 | Kiernan et al. |
| 2006/0281461 A1 * | 12/2006 | Kwun et al. .................. 455/436 |
| 2007/0010251 A1 | 1/2007 | Cho et al. |

OTHER PUBLICATIONS

W. Lee et al., "RS-initiated Handover Procedure for Handover-manageable RS," IEEE 802.16 Broadband Wireless Access Working Group, IEEE C802.16j-07/152r1, Jan. 2007.

* cited by examiner

*Primary Examiner* — Phuoc Doan
(74) *Attorney, Agent, or Firm* — Lee, Hong, Degerman, Kang & Waimey (57) ABSTRACT

A method for performing a handover in a mobile communication system, which is capable of independently performing an uplink handover and a downlink handover, is disclosed. An uplink channel status of a base station is checked and the uplink handover to a base station having a good uplink channel status is performed. A downlink channel status of a base station is checked and the downlink handover to a base station having a good downlink channel status is performed. Accordingly, an uplink base station and a downlink base station may be different from each other. Transmission/reception efficiency can be improved by independently performing the handover.

6 Claims, 8 Drawing Sheets

METHOD FOR PERFORMING DOWNLINK/UPLINK HANDOVER

CROSS-REFERENCE TO RELATED APPLICATIONS

This application is the National Stage filing under 35 U.S.C. 371 of International Application No. PCT/KR2008/002330, filed on Apr. 24, 2008, which claims the benefit of earlier filing date and right of priority to Korean Application No. 10-2007-0059361, filed on Jun. 18, 2007.

TECHNICAL FIELD

The present invention relates to handover of a mobile communication system, and more particularly, to a method for performing a downlink/uplink handover in a mobile communication system.

BACKGROUND ART

In a mobile communication system, a handover indicates a process which is performed for maintaining communication when a user equipment, for example, a mobile station moves between mobile communication areas, that is, from a base station area, in which communication is established, to another base station. In other words, the handover indicates an operation for performing the exchange of channels or lines so as to maintain a call. The handover may be performed in case where the status of a radio channel in a base station which is being used by a mobile station is bad, in a case where a mobile station moves from a current sector to another sector in a base station, or in a case where, when a mobile station moves from a current base station area to another base station area, the base stations are managed by the same mobile switching center (MSC) or different MSCs.

In order to perform a handover, a mobile station or a base station collects a downlink channel status, determines whether the handover is performed or not, and performs the handover regardless of uplink or downlink.

DISCLOSURE

Technical Problem

An object of the present invention devised to solve the problem lies on a method for performing an uplink handover and a method for performing a downlink handover in a mobile communication system.

Technical Solution

The object of the present invention can be achieved by providing a method for performing an uplink handover, the method including: receiving uplink resource allocation information of at least one neighboring base station from a serving base station; transmitting an uplink signal to the at least one neighboring base station; receiving uplink channel quality information associated with the uplink signal from the at least one neighboring base station; and performing the uplink handover to a neighboring base station selected based on the uplink channel quality information.

The uplink resource allocation information may be coordinated between the serving base station and the at least one neighboring base station. The method may further include receiving a signal having a specific pattern from the serving base station, and the signal having the specific pattern may be transmitted by the uplink signal. The signal having the specific pattern may be coordinated and determined between the serving base station and the at least one neighboring base station. The uplink channel quality information may be information acquired by receiving the uplink signal by the at least one neighboring base station. The at least one neighboring base station and the serving base station may be included in a diversity set.

The method may further include transmitting a scanning request message for the at least one neighboring base station, and receiving information necessary for performing the handover to the at least one neighboring base station in response to the scanning request message.

In another aspect of the present invention, provided herein is a method for performing an uplink/downlink handover, the method including: acquiring information about a downlink channel status corresponding to a serving base station and at least one neighboring base station; receiving information about an uplink channel status corresponding to the serving base station and the at least one neighboring base station; and independently performing at least one of the downlink handover and the uplink handover on the basis of at least one of the information about the downlink channel status and the information about the uplink channel status.

The method may further include receiving uplink resource allocation information of the at least one neighboring base station from the serving base station, and transmitting an uplink signal to the at least one neighboring base station, and the uplink resource allocation information is coordinated between the serving base station and the at least one neighboring base station.

The method may further include, when the downlink handover to a neighboring base station is performed, receiving downlink data from the neighboring base station to which the downlink handover is performed, and transmitting an acknowledgement signal for the downlink data to the neighboring base station to which the downlink handover is performed.

The method may further include, when the uplink handover to a neighboring base station is performed, transmitting uplink data to the neighboring base station to which the uplink handover is performed, and receiving an acknowledgement signal for the uplink data from the neighboring base station to which the uplink handover is performed.

The method may further include receiving downlink data from a downlink base station, and transmitting an acknowledgement signal for the downlink data to an uplink base station such that the uplink base station transmits the acknowledgement signal for the downlink data to the downlink base station.

The method may further include transmitting uplink data to an uplink base station, receiving an acknowledgement signal for the uplink data, which is transmitted from the uplink base station to a downlink base station, from the downlink base station.

In a further aspect of the present invention, provided herein is a method for performing an uplink handover, the method including: receiving information associated with a ranging code and ranging region allocation coordinated between a serving base station and at least one neighboring base station, from the serving base station; transmitting the received ranging code to the at least one neighboring base station via the allocated ranging region; receiving uplink channel status information corresponding to the ranging code from the at least one neighboring base station; and performing the uplink handover to a neighboring base station selected based on the uplink channel status information.

Advantageous Effects

According to one embodiment of the present invention, a downlink handover can be performed. According to one embodiment of the present invention, an uplink handover can be performed.

According to one embodiment of the present invention, a mobile station can independently perform an uplink handover and a downlink handover. Accordingly, it is possible to distribute loads applied to few base stations according to the amount and the type of uplink traffic and downlink traffic. In addition, if the uplink and downlink channel statuses between a base station and a mobile station are different from each other, the mobile station separately performs the handover so as to reduce packet loss when data is transmitted/received.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the preferred embodiments of the present invention, examples of which are illustrated in the accompanying drawings.

Figure 1:
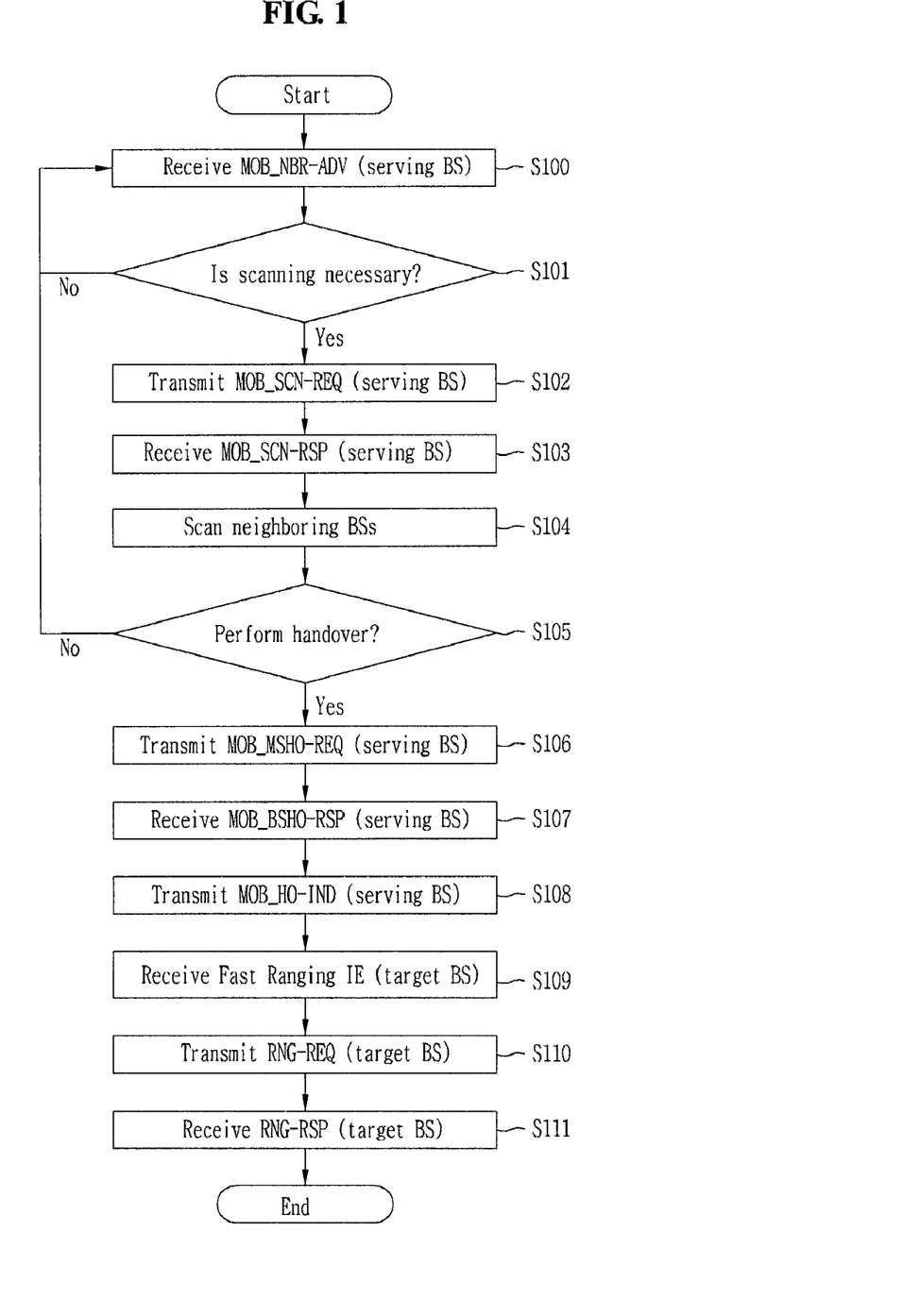
FIG. 1 is a flowchart illustrating a handover process.

FIG. 1 is a flowchart illustrating a handover process.

In order to perform a handover, in a step S100, a mobile station receives information about neighboring base stations from a serving base station via an MOB_NBR-ADV message. The information about the neighboring base stations from the serving base station may be transmitted from the serving base station to the mobile station by the request of the mobile station or periodically.

Then, if it is determined that scanning is necessary for selecting a target base station for the handover in a step S101, the mobile station can exchange an MOB_SCN-REQ/RSP message in steps S102 and S103. In other words, the mobile station can acquire information necessary for the process of scanning neighboring base stations, for example, a scan start frame and a period, for acquiring the information about the neighboring base stations. Then, in a step S104, the scanning process is performed. The mobile station can acquire information which can check channel statuses for downlink transmission of the neighboring base stations, by the scanning process. Examples of the information which can be acquired by the scanning process include base station type information, an identifier for connection between the mobile station and the base station, type information of base station or service identifier scanning (e.g., active scanning or passive scanning), a channel list, probe delay information, minimum channel time information and maximum channel time information.

If it is determined that the handover is necessary according to the scanning result in a step S105, the mobile station requests the handover to the serving base station via a MOB_MSHO-REQ message. At this time, the mobile station transmits a handover request message in which a target base station is clarified by the scanning process. The base station checks whether the handover to the target base station is available or not via a backbone message with the target base station and transmits an MOB_BSHO-RSP message in a step S107.

If the handover to the target base station can be performed in the step S107, the mobile station transmits a MOB_HO-IND message to the serving base station in order to inform the service base station of the actual start of the handover in a step S108. The serving base station which receives the MOB_HO-IND message terminates the connection with the mobile station.

After the target base station recognizes that the mobile station starts the handover, a Fast_Ranging_IE message is transmitted in a step S109. In this case, the Fast_Ranging_IE message includes uplink resource information which is allocated such that the mobile station transmits a RNG-REQ message by a non-contention based method.

In a step S110, the mobile station transmits a RNG-REQ message to the target base station using the allocated uplink resource so as to make a ranging request. Then, in a step S111, the target base station receives a RNG-RSP message which is transmitted as a ranging response. Here, the RNG-RSP message includes a physical parameter associated with the ranging.

According to the method for performing the handover, which is described with reference to FIG. 1, the mobile station performs the handover with respect to the base station on the basis of the scanning result regardless of uplink/downlink. That is, the handover is performed in the unit of a base station. Accordingly, when the mobile station performs the handover, an independent link status of the uplink/downlink, the nature of uplink/downlink traffic, or load balance according to traffic amount are not considered. Thus, a method for performing an independent uplink/downlink handover will now be described via embodiments of the present invention. Accordingly, a method which is efficient in view of network efficiency and data transmission/reception of the mobile station when performing the handover will be provided. First, a method for performing a downlink handover will be described.

In the following description, it is assumed that a serving base station and neighboring base stations are included in a diversity set and communication between the base stations, such as message exchange between the base stations, included in the diversity set can be relatively freely performed. The serving base station and the neighboring base stations included in the diversity set in a synchronization state may be added to or may be removed from the diversity set according to an uplink/downlink status.

According to the embodiment of the present invention, since the serving/target base station for uplink transmission and the serving/target base station for downlink transmission may be different from each other with respect to the same mobile station, the serving/target base station for downlink transmission is abbreviated to a downlink serving/target base station (DL serving/target BS) and the serving/target base station for uplink transmission is abbreviated to an uplink serving/target base station (UL serving/target BS).

Figure 2:
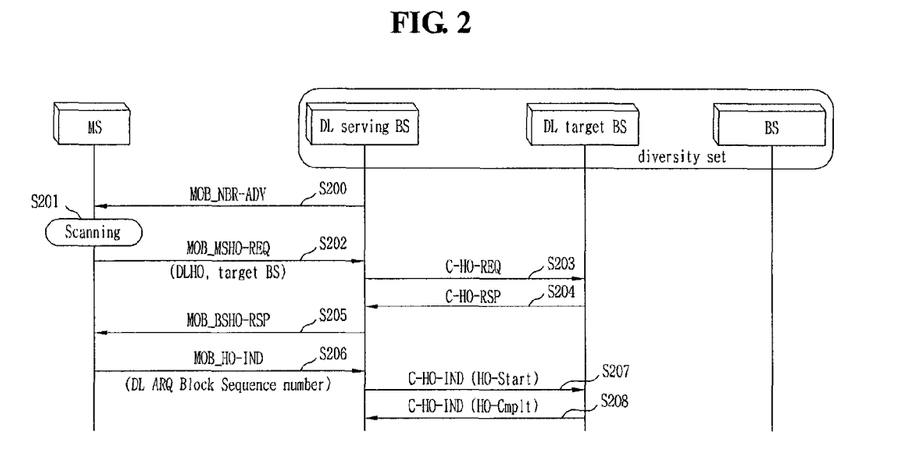
FIG. 2 is a flowchart illustrating a method for performing a downlink handover according to an embodiment of the present invention.

FIG. 2 is a flowchart illustrating a method for performing a downlink handover according to an embodiment of the present invention.

First, in a step S200, similar to the handover method shown in FIG. 1, the downlink serving base station transmits information about the neighboring base stations to the mobile station via an MOB_NBR-ADV message. The MOB-NBR-ADV message may include information about the neighboring base stations from the serving base station and may be transmitted from the serving base station to the mobile station by the request of the mobile station or periodically.

Similarly, if necessary, in a step S201, a process of scanning the neighboring base stations is performed. A downlink channel status (DL CINR) is checked by the scanning process. The mobile station determines whether a downlink handover is performed or not via the downlink channel status. That is, if it is determined that the downlink channel status of the current serving base station is better than the channel statuses of the neighboring base stations via the scanning process, the downlink handover will not be performed and, otherwise, the downlink handover will be performed.

The mobile station which determines that the downlink handover should be performed transmits an MOB_MSHO-REQ message and requests the downlink handover in a step S202. The MOB_MSHO-REQ message may include a downlink handover request indicator and downlink target base station information. It may be informed that the transmitted handover request is the downlink and/or uplink handover request. Although it is not informed that the handover is associated with the uplink and/or the downlink in the step S202, this information may be informed while the handover is performed. In a process of transmitting/receiving a scanning message, a method for dividing a scanning type according to the uplink and/or downlink handover may be used. In this case, it is apparent that the scanning process is not restricted.

In steps S203 and S204, the downlink serving base station checks whether the handover is available by the exchange of the message with the target base station.

In a step S205, the serving base station transmits an MOB_BSHO-RSP message to the mobile station in response thereto. By the transmission of the message, information indicating whether the handover to the target base station selected by the mobile station is possible is sent.

If the information indicating that the handover is possible is received, the mobile station transmits an MOB_HO-IND message to the serving base station in order to inform the serving base station of the actual start of the downlink handover. At this time, sequence number information of downlink data received from the serving base station may be sent together.

In a step S207, the serving base station informs the target base station of the start of the handover via the transmission/reception of the message such as the backbone message to/from the target base station. At this time, sequence number of downlink data ACK may be informed. Finally, in a step S208, the target base station informs the serving base station that the handover is completed.

The downlink handover is partially similar to the handover described with reference to FIG. 1 in that the downlink channel status is checked and the handover and the target base station are then selected, but is different therefrom in that both the uplink and downlink handovers are not performed and the downlink handover can be independently performed via the downlink channel status.

Figure 3:
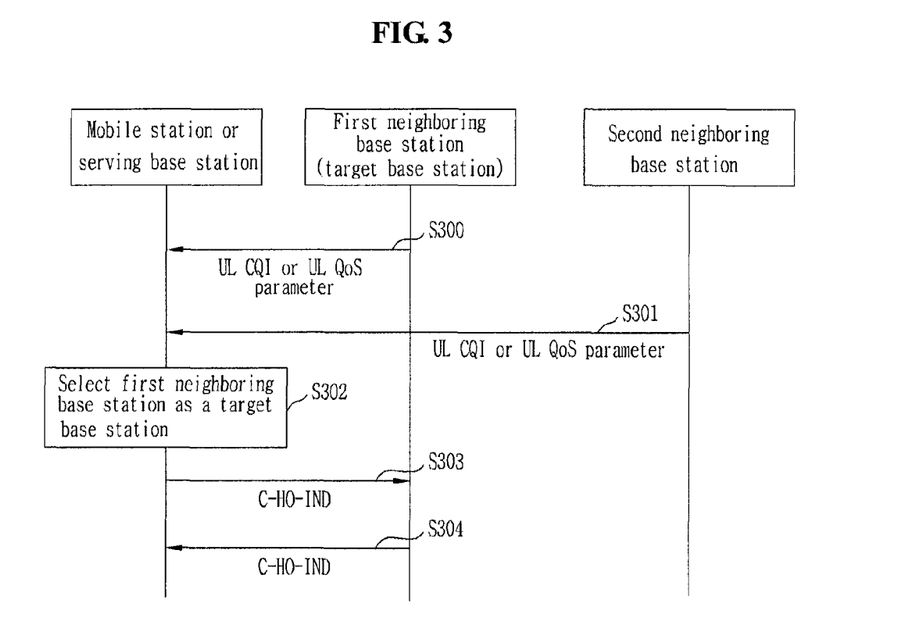
FIG. 3 is a flowchart illustrating a method for performing an uplink handover according to an embodiment of the present invention.

FIG. 3 is a flowchart illustrating a method for performing an uplink handover according to an embodiment of the present invention.

The present embodiment relates to the method for performing the uplink handover. The uplink handover is performed in consideration of an uplink channel status. That is, when the uplink handover is performed, in order to consider the uplink channel status, the mobile station first transmits uplink data to neighboring base stations (not shown). Then, in steps S300 and S301, the mobile station or the serving base station which is a subject of the handover receives information indicating the channel status for the uplink transmission from the serving base station and the neighboring base stations included in a diversity set. The received uplink channel status is compared with the uplink channel status of the current serving base station so as to check whether the uplink handover should be performed or not.

If it is determined that the uplink handover should be performed, in a step S302, the mobile station or the serving base station which is the subject of the handover selects a first neighboring base station which is one of the neighboring base stations as a target base station. The serving base station informs the target base station of the start of the handover by the exchange of a C-HO-IND message in a step S304. If the uplink data sequence number transmitted from the mobile station to the serving base station is different from the uplink data sequence number received by the target base station, the information of the serving base station may be sent to the target base station.

Hereinafter, a method for performing an uplink handover at a station for starting the uplink handover will be described in detail with reference to the accompanying drawings.

Figure 4:
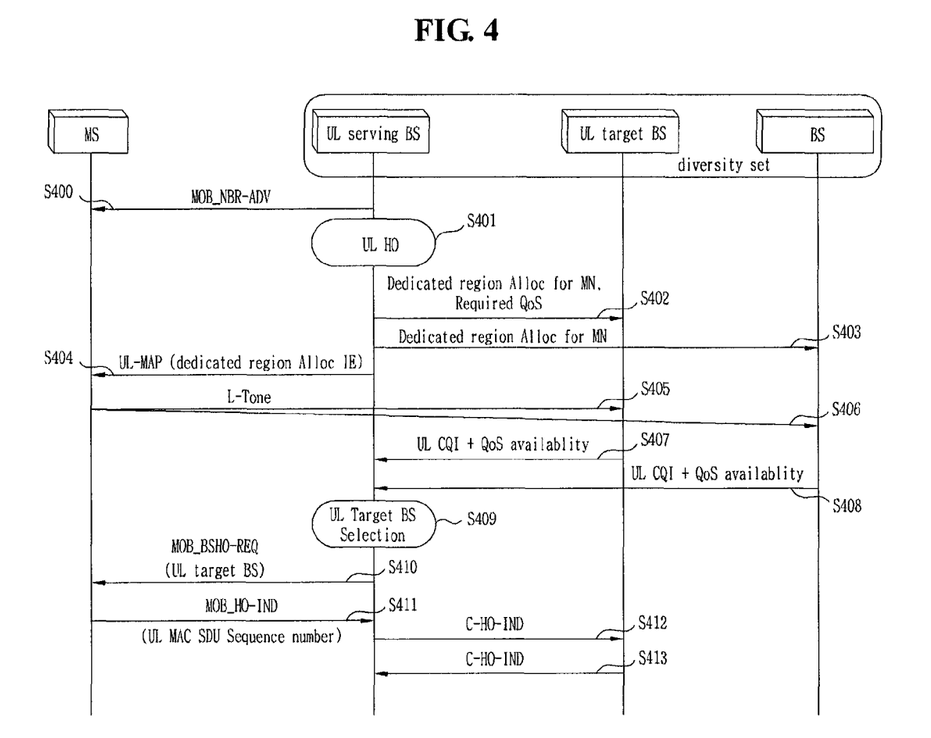
FIG. 4 is a flowchart illustrating a method for performing an uplink handover according to an embodiment of the present invention.

FIG. 4 is a flowchart illustrating a method for performing an uplink handover according to an embodiment of the present invention.

In particular, FIG. 4 shows a case where the uplink serving base station starts the uplink handover.

In a step S400, the serving base station sends information about the neighboring base stations to the mobile station via an MOB_NBR-ADV message. The MOB_NBR-ADV message may include information about the neighboring base stations from the serving base station and may be transmitted from the serving base station to the mobile station by the request of the mobile station or periodically.

In a step S401, the uplink serving base station checks whether the current uplink channel status of the mobile station is bad and determines whether the uplink handover or not should be performed. That is, a process of checking the statuses of the neighboring base stations for performing the uplink handover and determining whether the uplink handover or not should be performed is performed.

First, in steps S402 and S403, the serving base station requests neighboring base stations to allocate an uplink transmission resource for the mobile station. At this time, the serving base station may inform the neighboring base stations of a dedicated resource region or the same resource region. In this case, in comparison with a case where the resource region varies according to the neighboring base stations, transmission/reception efficiency can be improved from the viewpoint of the mobile station which receives and uses information about an uplink resource region. In addition, an uplink signal for determining whether the uplink handover is performed or not and/or selecting a target base station which will perform the uplink handover is received via a previously reserved uplink resource such that the transmission/reception efficiency can be improved from the viewpoint of the target base station.

For transmission of a message for requesting the allocation of the uplink transmission resource for the mobile station to the neighboring base stations, a backbone message which is exchanged between the base stations may be used. The base stations prepare for the check of the uplink state. Using the uplink transmission resource allocated at that time, a specific code or a tone which will be transmitted by the mobile station may be specified and the information thereof may be informed. Service of quality (QoS) information requested by the mobile station may be transmitted to the neighboring base stations together with the backbone message.

In a step S404, the serving base station transmits an UL-MAP message including information about the uplink transmission resource allocated to the mobile station. In the steps S402 and S403, if the specific code or tone which will be transmitted by the terminal is specified, the information thereof may be transmitted.

In steps S405 and S406, the mobile station which receives the information about the uplink transmission resource transmits the uplink signal to the neighboring base stations such that the neighboring base stations measure the uplink channel status. If the specific code or tone which will be transmitted by the mobile station is specified in the step S402 and S403, the specified code or tone is transmitted. In this case, it is preferable that the uplink signal transmitted by the mobile station can be received by the serving base station and all the neighboring base stations. In consideration of a case where the base stations cannot receive the uplink signal transmitted by the mobile station at a predetermined time, the mobile station may transmit the uplink signal at a predetermined time offset interval.

In steps S407 and S408, the neighboring base stations receive the uplink signal transmitted by the mobile station, measure the uplink channel states for the mobile station, and transmit the uplink channel statuses to the serving base station. At this time, information indicating whether or not the QoS information for the mobile station can be supported may be transmitted to the serving base station together. It is preferable that the serving base station, which receives the uplink channel statuses and the information indicating whether or not the QoS information can be supported from the neighboring base stations, distinguishes between the uplink channel statuses and/or the information indicating whether or not the QoS information can be supported. That is, if at least one uplink channel status and/or information indicating whether or not the QoS information can be supported are received, it is preferable that it is checked from which neighboring base stations they are transmitted.

The serving base station which receives the uplink channel statuses and/or the information indicating whether or not the QoS information can be supported from the neighboring base stations selects a target base station for the uplink handover on the basis of the received information in a step S409. If it is determined that the uplink handover does not need to be performed via the uplink channel statuses and/or the information indicating whether or not the QoS information can be supported, the uplink transmission to the current serving base station is maintained and the handover is not performed.

In a step S410, the serving base station requests the handover to the mobile station via an MOB_BSHO-REQ message. At this time, the MOB_BSHQ-REQ message includes information about the selected target base station.

The mobile station transmits an MOB_HO-IND message to the serving base station and informs the serving base station of the start of the uplink handover in a step S411. At this time, as described above, the sequence number of the uplink transmission data may be transmitted together.

Finally, in steps S412 and S413, the serving base station exchanges a C-HO-IND message with the target base station so as to exchange ACK information or the sequence number of the uplink transmission data received by the serving base station and informs the target base station of the start of the uplink handover of the mobile station.

Figure 5:
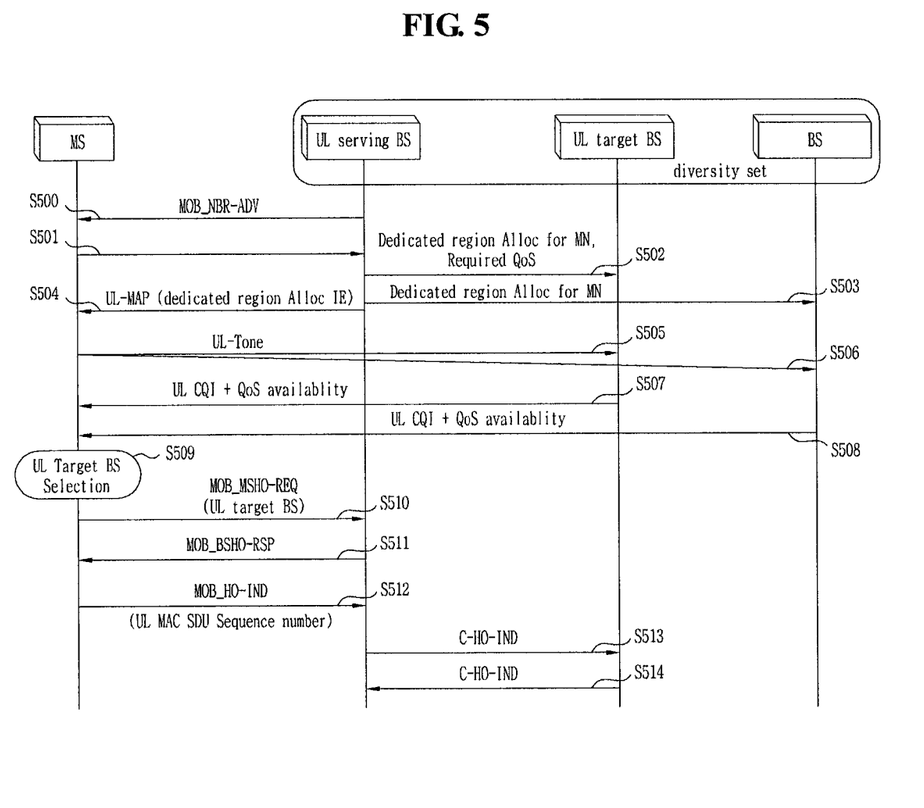
FIG. 5 is a flowchart illustrating a method for performing an uplink handover according to another embodiment of the present invention.

FIG. 5 is a flowchart illustrating a method for performing an uplink handover according to another embodiment of the present invention.

In particular, FIG. 5 shows a case where the uplink serving base station starts the uplink handover.

Similar to FIG. 4, in steps S500 to S506, the mobile stations receives information about neighboring base stations, checks whether the uplink handover is necessary, and determines whether or not the uplink handover is performed. That is, a process of checking the statuses of the neighboring base stations for performing the uplink handover and determining whether the uplink handover should be performed is performed.

The serving base station receives the signal from the mobile station, requests the allocation of an uplink transmission resource for the mobile station to the neighboring base stations, and transmits a signal including the allocated uplink resource information to the mobile station. Then, the mobile station checks the uplink resource information received from the serving base station and transmits the uplink signal to the neighboring base stations. At this time, similar to FIG. 4, a specific signal may be specified and uplink transmitted.

In steps S506 and S507, the neighboring base stations receive the uplink signal transmitted by the mobile station, measure the uplink channel states for the mobile station, and transmit the uplink channel statuses to the mobile station. In this case, it is different from FIG. 4 in that the measured result is transmitted to the mobile station instead of the serving base station. At this time, information indicating whether or not the QoS information for the mobile station can be supported may be transmitted to the serving base station together.

Even in this case, it is preferable that the mobile station distinguishes between the uplink channel statuses and/or the information indicating whether or not the QoS information can be supported. That is, if at least one uplink channel status and/or information indicating whether or not the QoS information can be supported are received, it is preferable that it is checked from which neighboring base stations they are transmitted.

The mobile station which receives the uplink channel statuses and/or the information indicating whether or not the QoS information can be supported from the neighboring base stations selects a target base station for the uplink handover on the basis of the received information in a step S509. If it is determined that the uplink handover needs not be performed via the uplink channel statuses and/or the information indicating whether or not the QoS information can be supported, the uplink transmission to the current serving base station is maintained and the handover is not performed.

In a step S510, the mobile station requests the handover to the serving base station via an MOB_MSHO-REQ message. At this time, the MOB_BSHQ-REQ message includes information about the selected target base station. The serving base station transmits an MOB_BSHO-RSP message to the mobile station in a step S511, and the mobile station which receives it transmits an MOB_HO-IND to the serving base station and informs the serving base station of the start of the uplink handover in a step S512. At this time, as described above, the sequence number of the uplink transmission data may be transmitted together.

Finally, in steps S513 and S514, the serving base station exchanges a C-HO-IND message with the target base station so as to exchange ACK information or the sequence number of the uplink transmission data received by the serving base station and informs the target base station of the start of the uplink handover of the mobile station.

As described with reference to FIGS. 4 and 5, the neighboring base stations allocate the uplink resource regions and inform the mobile station of the uplink resource regions and the mobile station transmits the uplink signal to the neighboring base stations for determining the uplink handover using the uplink resource regions. The uplink signal may be transmitted using the existing specific message and a process of transmitting/receiving a message as described below. A method for using the existing process without performing a supplementary process in order to perform the uplink handover will be described. Although a method for using a ranging process is described later, the ranging process is only exemplary and other methods may be used. The ranging process indicates a process of performing time synchronization, frequency synchronization and power control during the initial access of the mobile station or the handover.

Figure 6:
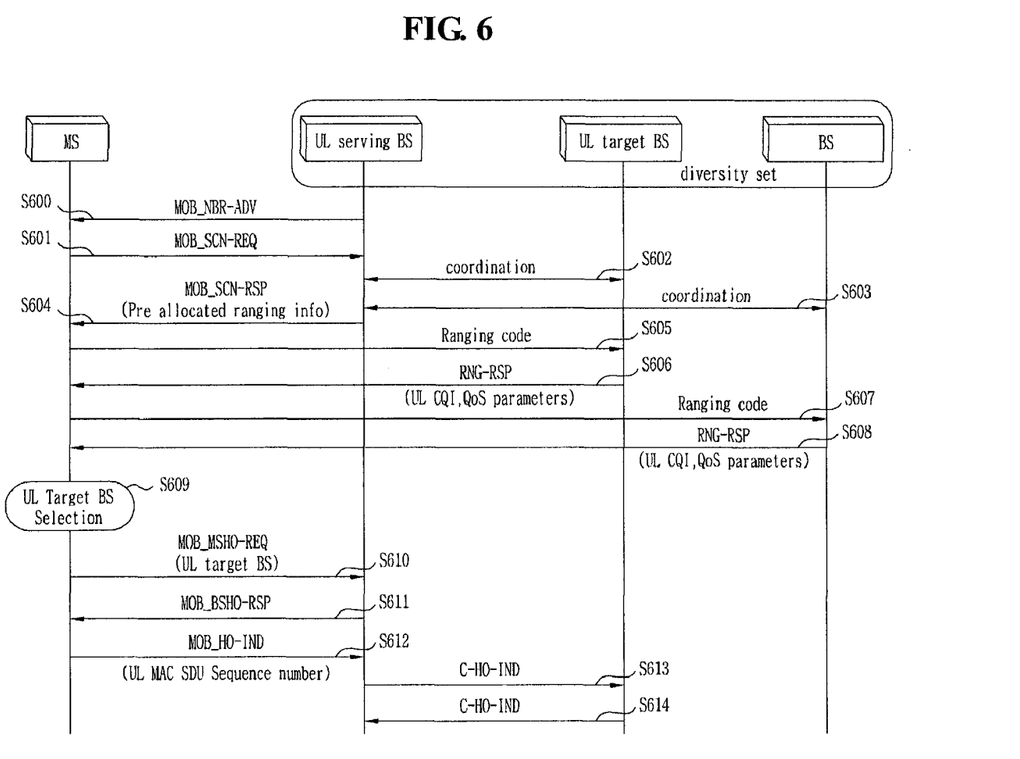
FIG. 6 is a flowchart illustrating a method for performing an uplink handover according to another embodiment of the present invention.

FIG. 6 is a flowchart illustrating a method for performing an uplink handover according to another embodiment of the present invention.

FIG. 6 shows a case where the mobile station starts the handover and a method for acquiring information necessary for the uplink handover using the ranging process.

First, in a step S600, the serving base station transmits information about the neighboring base stations to the mobile station via an MOB_NBR-ADV message. The MOB_NBR-ADV includes the information about the neighboring base stations from the serving base station as described above and may be transmitted from the serving base station to the mobile station by the request of the mobile station or periodically.

In a step S601, an MOB_SCN-REQ message for requesting the scanning process is transmitted to the serving base station. At this time, an indicator that instructs the serving base station to perform a coordination process with the neighboring base stations may be included in the MOB_SCN-REQ message. The MOB_SCN-REQ message in which a specific scanning type is defined and set as a scanning type corresponding to the present embodiment may be transmitted, in order to inform that a general scanning process is performed, a process of performing the uplink handover is performed or a process of performing the uplink handover started by the mobile station is performed. For example, the MOB_SCN-REQ message in which the scanning type is set to 0010 may be transmitted. If a connection process is performed, a connection level is set and the type of the handover and the information about a station for starting the handover may be informed. For example, the connection level is set to 1 and is informed to the serving base station.

In the step S601, regardless of the ranging process, any message including the indicator that instructs the serving base station to perform the coordination process with the neighboring base stations may be used.

The serving base station which receives the indicator indicating that the coordination process should be performed from the mobile station performs the coordination process in steps S602 and S603. At this time, in the coordination process, a specific pattern which will be uplink transmitted by the mobile station and/or uplink resource allocation information from the neighboring base stations may be coordinated and/or determined.

For example, the serving base station receives transmission opportunity information in a ranging region and a ranging code from the neighboring base stations included in the diversity set by the coordination process. In this case, the serving base station checks the received transmission opportunity information in the ranging region and performs the coordination process such that the same time is not allocated to the neighboring base stations. As described above, it goes without saying that the process of coordinating the specific pattern which will be uplink transmitted by the mobile station and/or the uplink resource allocation information from the neighboring base stations may be performed independent of the ranging process.

In a step S604, the serving base station transmits the information coordinated by the coordination process to the mobile station via an MOB_SCN-RSP message. The mobile station may expect a UL-MAP corresponding to a frame next to a rendezvous time included in the MOB_SCN-RSP message, receive the UL-MAP corresponding to the frame next to the rendezvous time, and acquire the transmission opportunity information in the ranging region and/or the ranging code. Here, the ranging code is composed of a CDMA code and may be also called the CDMA code.

In a step S605, the mobile station transmits the ranging code, the signal having a constant pattern allocated via the ranging region or the coordination process, to the neighboring base stations via the uplink resource. The neighboring base stations which receive the uplink signal, for example the ranging code, transmitted in the step S605, checks the uplink channel statuses via the received ranging code and transmits the checked result to the mobile station via a RNG-RSP message in a step S606. Steps S607 and S608 are performed between different base stations and the mobile stations included in the diversity set and may be performed similar to the steps S605 and S606.

In other words, the neighboring base stations receive the ranging code and transmit to the mobile station the QoS parameter and the indicator indicating the uplink channel statuses acquired when the neighboring base stations receive the ranging code via the RNG-RSP message. If the above-described connection process is performed, the ranging information may be transmitted together via the RNG-RSP message. If the above-described connection process is not performed, the QoS parameter and the indicator indicating the uplink channel statuses may be transmitted to the mobile station via the RNG-RSP message or other messages.

The mobile station selects an uplink target base station on the basis of the received QoS parameter and the indicator indicating the uplink channel statuses in a step S609 and transmits an MOB_MSHO-REQ message including the information about the target base station selected by the serving base station so as to request the handover in a step S610. In a step S611, the serving base station transmits an MOB-BSHO-RSP message in response thereto.

The mobile station which receives the MOB-BSHO-RSP message transmits an MOB_HO-IND message in order to inform the serving base station of the substantial start of the handover in a step S612. At this time, the mobile station transmits the sequence number of the uplink data together as described above such that the serving base station transmits it to the uplink target base station.

Finally, in steps S613 and S614, the serving base station exchanges a C-HO-IND message with the target base station and informs the target base station of the start of the uplink handover. At this time, if the uplink data sequence number transmitted from the mobile station to the serving base station is different from the uplink data sequence number received by the target base station, the information of the serving base station may be sent to the target base station.

Figure 7:
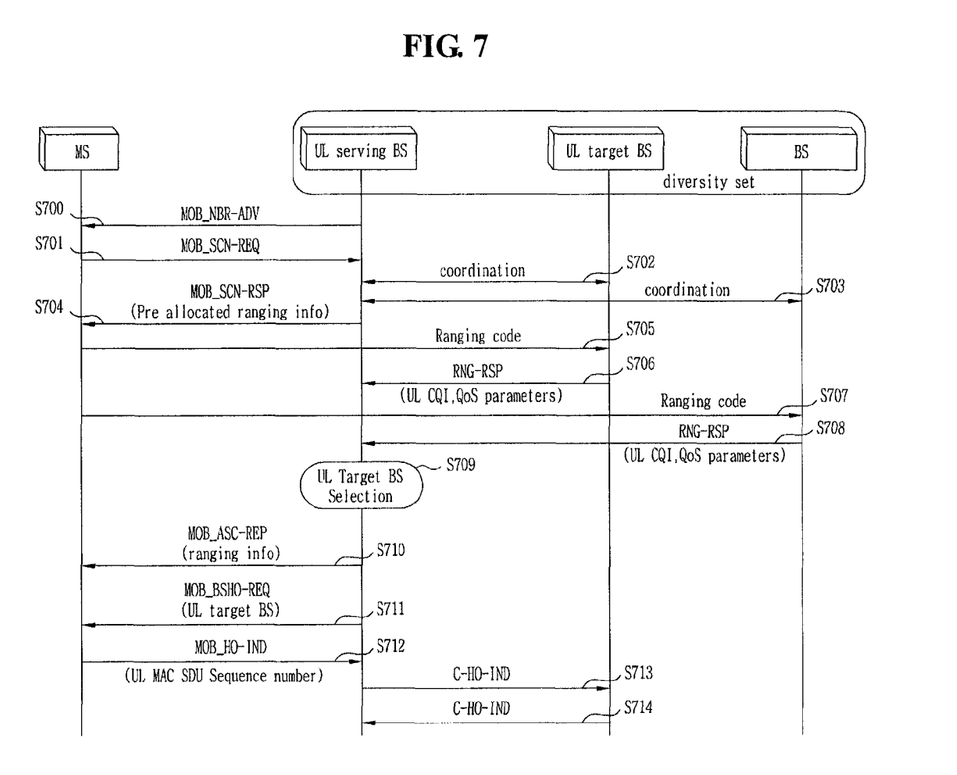
FIG. 7 is a flowchart illustrating a method for transmitting an acknowledgement signal according to an embodiment of the present invention.

FIG. 7 is a flowchart illustrating a method for transmitting an acknowledgement signal according to an embodiment of the present invention.

FIG. 7 shows a case where the serving base station starts the handover and a method for acquiring information necessary for performing the uplink handover using the ranging process, unlike FIG. 6.

First, in a step S700, the serving base station transmits information about the neighboring base stations to the mobile station via an MOB_NBR-ADV message. The MOB_NBR-ADV includes the information about the neighboring base stations from the serving base station as described above and may be transmitted from the serving base station to the mobile station by the request of the mobile station or periodically.

In a step S701, an MOB_SCN-REQ message for requesting the scanning process is transmitted to the serving base station. At this time, an indicator that instructs the serving base station to perform a coordination process with the neighboring base stations may be included in the MOB_SCN-REQ message. The MOB_SCN-REQ message in which a specific scanning type is defined and set as a scanning type corresponding to the present embodiment may be transmitted, in order to inform that a general scanning process is performed, a process of performing the uplink handover is performed or a process of performing the uplink handover started by the serving base station is performed. For example, the MOB_SCN-REQ message in which the scanning type is set to 0011 may be transmitted. If a connection process is performed, a connection level is set and the type of the handover and the information about a station for starting the handover may be informed. For example, the connection level is set to 2 and is informed to the serving base station.

In the step S701, any message including the indicator that instructs the serving base station to perform the coordination process with the neighboring base stations regardless of the ranging process may be used.

The serving base station which receives the indicator indicating that the coordination process should be performed from the mobile station performs the coordination process in steps S702 and S703. At this time, in the coordination process, a specific pattern which will be uplink transmitted by the mobile station and/or uplink resource allocation information from the neighboring base stations may be coordinated and/or determined.

For example, the serving base station receives transmission opportunity information in a ranging region and a ranging code from the neighboring base stations included in the diversity set by the coordination process. In this case, the serving base station checks the received transmission opportunity information in the ranging region and performs the coordination process such that the same time is not allocated to the neighboring base stations. As described above, it goes without saying that the process of coordinating the specific pattern which will be uplink transmitted by the mobile station and/or the uplink resource allocation information from the neighboring base stations may be performed independent of the ranging process.

In a step S704, the serving base station transmits the information coordinated by the coordination process to the mobile station via an MOB_SCN-RSP message. The mobile station may expect a UL-MAP corresponding to a frame next to a rendezvous time included in the MOB_SCN-RSP message, receive the UL-MAP corresponding to the frame next to the rendezvous time, and acquire the transmission opportunity information in the ranging region and/or the ranging code. Here, the ranging code is composed of a CDMA code and may be also called the CDMA code.

In a step S705, the mobile station transmits the ranging code, that is, the signal having a constant pattern allocated via the ranging region or the coordination process, to the neighboring base stations via the uplink resource. The neighboring base stations which receive the uplink signal transmitted in the step S705, that is, the ranging code, checks the uplink channel statuses via the received ranging code and transmits the checked result to the serving base station via a RNG-RSP message in a step S706.

In other words, the present embodiment is different from the embodiment of FIG. 6 in that the uplink channel statuses are checked by the signal transmitted via the transmission resource in the uplink resource region allocated by the mobile station, for example, in the ranging region and the checked result is transmitted to the serving base station instead of the mobile station. The mobile station transmits the predetermined signal received by the above-described method, for example, the ranging code via the allocated uplink resource, but does not need to wait for a response message corresponding to the uplink transmission or the RNG-RSP message.

In other words, the neighboring base stations receive the predetermined signal, for example, the ranging code and transmit to the mobile station the QoS parameter and the indicator indicating the uplink channel statuses acquired when the neighboring base stations receive the ranging code via the RNG-RSP message. If the above-described connection process is performed, the ranging information may be transmitted together via the RNG-RSP message. If the above-described connection process is not performed, the QoS parameter and the indicator indicating the uplink channel statuses may be transmitted to the serving base station via the RNG-RSP message or other messages. Steps S707 and S708 are performed between different base stations and the mobile stations included in the diversity set and may be performed similar to the steps S705 and S706.

The serving base station selects an uplink target base station on the basis of the received QoS parameter and the indicator indicating the uplink channel statuses in a step S709 and transmits an MOB_BSHO-REQ message including the information about the target base station selected by the serving base station to the mobile station so as to request the handover in a step S711. The serving base station may transmit ranging related information received from the neighboring base stations to the mobile station via an MOB_ASC-REP message in a step S710. The step S710 may be performed before the step S709 of selecting the target base station by the serving base station or may be omitted as necessary.

The mobile station transmits an MOB_HO-IND message in order to inform the serving base station of the substantial start of the handover in response thereto in a step S712. At this time, the mobile station transmits the sequence number of the uplink data together as described above such that the serving base station transmits it to the uplink target base station.

Finally, in steps S713 and S714, the serving base station exchanges a C-HO-IND message with the target base station and informs the target base station of the start of the uplink handover. At this time, if the uplink data sequence number transmitted from the mobile station to the serving base station is different from the uplink data sequence number received by the target base station, the information of the serving base station may be sent to the target base station.

As described above, the uplink handover and the downlink handover can be independently performed. In other words, in consideration of both the uplink channel status and the downlink channel status, a base station having a good uplink channel status is selected as the uplink target base station so as to perform the handover and a base station having a good downlink channel status is selected as the downlink target base station so as to perform the handover. When the uplink handover and the downlink handover are independently performed in a state in which the uplink channel status and the downlink channel status vary according to the base stations, more excellent effect can be obtained.

Hereinafter, a method for transmitting an acknowledgement signal, for example, an ACK signal when it is determined that an uplink serving base station and a downlink serving base station are different from each other by independently performing the handover so as to transmit/receive data will be described.

Figure 8:
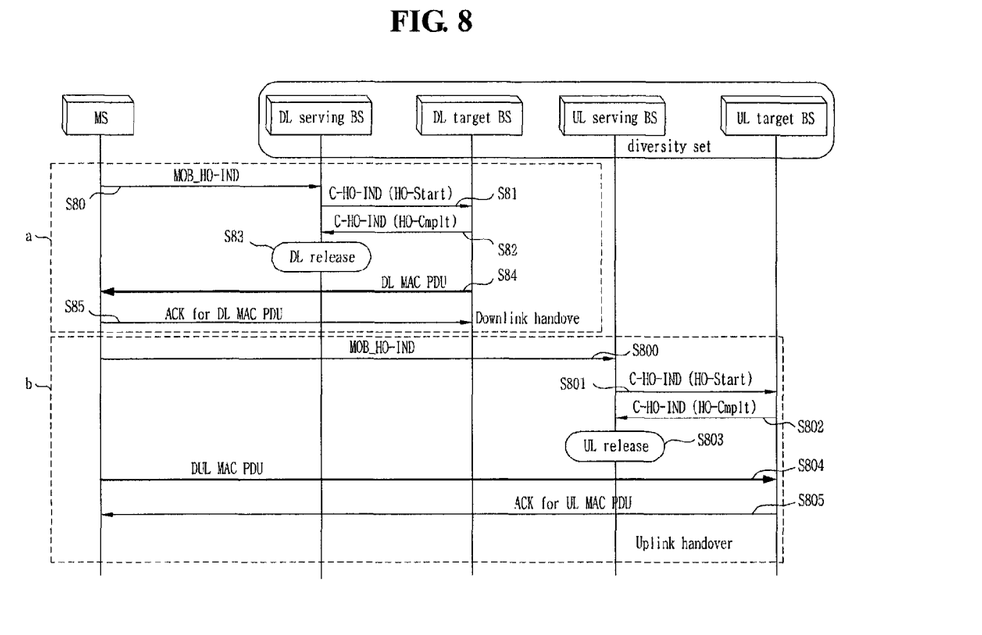
FIG. 8 is a flowchart illustrating a method for transmitting an acknowledgement signal according to an embodiment of the present invention.

FIG. 8 is a flowchart illustrating a method for transmitting an acknowledgement signal according to an embodiment of the present invention.

A portion 'a' of FIG. 8 shows a method for transmitting the acknowledgement signal for the downlink data when the downlink handover is performed according to a variation in downlink channel status.

First, in a step S80, the mobile station transmits an MOB_HO-IND message to the downlink serving base station in order to inform the downlink serving base station of the start of the handover. At this time, the mobile station transmits the downlink data sequence signal together as described above such that the downlink serving base station transmits it to the downlink target base station.

In steps S81 and S82, the downlink serving base station exchanges a C-HO-IND message with the downlink target base station and informs the target base station of the start of the handover. Accordingly, when the handover is performed, the connection between the downlink serving base station and the mobile station is released in a step 83.

The downlink target base station which newly becomes the downlink serving base station transmits the downlink data (e.g., DL MAC PDU) to the mobile station in a step S84. Then, in a step S85, the mobile station which receives the downlink data transmits the acknowledgement signal for the received data, for example, the ACK signal to the downlink target base station which transmits the downlink data (e.g., DL MAC PDU) to the mobile station in the step S84. Although the uplink channel status of the downlink target base station is relatively bad, a process of transmitting the acknowledgement signal is simplified. That is, since the ACK signal is directly transmitted to the base station which transmits the data, a supplementary process for properly transmitting the ACK signal does not need to be performed.

A portion 'b' of FIG. 8 shows a method for transmitting the acknowledgement signal for the uplink data when the uplink handover is performed according to a variation in uplink channel status.

First, in a step S800, the mobile station transmits an MOB_HO-IND message to the uplink serving base station in order to inform the uplink serving base station of the start of the handover. At this time, the mobile station transmits the uplink data sequence signal together as described above such that the uplink serving base station transmits it to the uplink target base station.

In steps S801 and S802, the uplink serving base station exchanges a C-HO-IND message with the uplink target base station and informs the uplink target base station of the start of the handover. Accordingly, when the uplink handover is performed, the connection between the uplink serving base station and the mobile station is released in a step 803.

The uplink target base station which newly becomes the uplink serving base station receives the uplink data (e.g., UL MAC PDU) from the mobile station in a step S804. Then, in a step S805, the uplink target base station which receives the uplink data transmits the acknowledgement signal for the received data, for example, the ACK signal to the mobile station. Although the downlink channel status of the uplink target base station is relatively bad, a process of transmitting the acknowledgement signal is simplified. That is, since the ACK signal is directly transmitted to the base station which transmits the data, a supplementary process for properly transmitting the ACK signal does not need to be performed.

Figure 9:
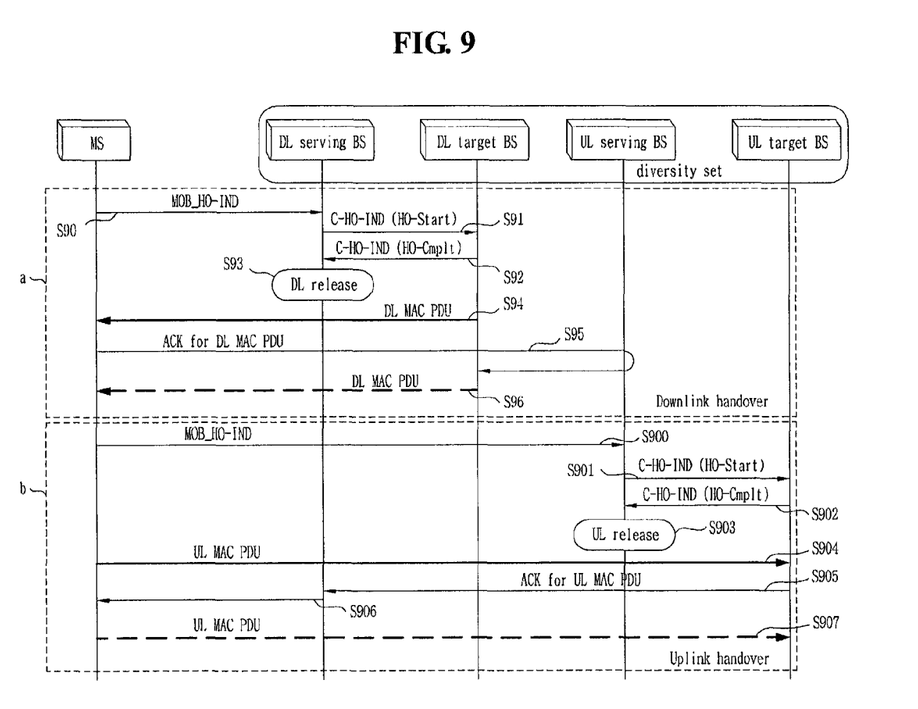
FIG. 9 is a flowchart illustrating a method for transmitting an acknowledgement signal according to an embodiment of the present invention.

FIG. 9 is a flowchart illustrating a method for transmitting an acknowledgement signal according to an embodiment of the present invention.

A portion a of FIG. 9 shows a method for transmitting the acknowledgement signal for the downlink data when the downlink handover is performed according to a variation in downlink channel status.

First, in a step S90, the mobile station transmits an MOB_HO-IND message to the downlink serving base station in order to inform the downlink serving base station of the start of the handover. At this time, the mobile station transmits the downlink data sequence signal together as described above such that the downlink serving base station transmits it to the downlink target base station.

In steps S91 and S92, the downlink serving base station exchanges a C-HO-IND message with the downlink target base station and informs the target base station of the start of the handover. Accordingly, when the handover is performed, the connection between the downlink serving base station and the mobile station is released in a step 93.

The downlink target base station which newly becomes the downlink serving base station transmits the downlink data (e.g., DL MAC PDU) to the mobile station in a step S94. Then, in a step S95, the mobile station which receives the downlink data transmits the acknowledgement signal for the received data, for example, the ACK signal to the uplink base station. Here, the uplink base station is the current uplink serving base station. That is, if the uplink handover to the uplink target base station is performed, the uplink target base station to which the handover is performed may become the uplink base station. In other words, the ACK signal is transmitted to the uplink serving base station or the uplink base station to which the handover is performed if the uplink handover is performed, instead of the downlink target base station which transmits the downlink data to the mobile station in the step S94. If the uplink base station and the downlink base station are identical, the ACK signal is transmitted to the base station which transmits the downlink data. In this case, the ACK signal is transmitted to the uplink base station having a good uplink channel status so as to increase a reception probability of the ACK signal.

If the base station which transmits the downlink data and the base station which receives the ACK signal are different from each other, it is preferable that the ACK signal for the downlink data received by the uplink base station is transmitted to the base station which transmits the downlink data such that retransmission or transmission of new data is performed.

Accordingly, in the step S95, the uplink base station transmits the ACK signal for the received downlink data to the base station which transmits the downlink data. In particular, if the uplink base station and the downlink base station are included in the same diversity set, communication between the base stations can be appropriately performed and thus more excellent effect is obtained compared with a case where the uplink base station and the downlink base station are included in different diversity sets.

In a step S96, the downlink target base station which receives the ACK signal transmits new downlink data to the mobile station. If a negative ACK signal, that is, a NACK signal, is received, the transmitted downlink data may be retransmitted.

A portion 'b' of FIG. 9 shows a method for transmitting the acknowledgement signal for the uplink data when the uplink handover is performed according to a variation in downlink channel status.

First, in a step S900, the mobile station transmits an MOB_HO-IND message to the uplink serving base station in order to inform the uplink serving base station of the start of the handover. At this time, the mobile station transmits the uplink data sequence signal together as described above such that the uplink serving base station transmits it to the uplink target base station.

In steps S901 and S902, the uplink serving base station exchanges a C-HO-IND message with the uplink target base station and informs the uplink target base station of the start of the handover. Accordingly, when the uplink handover is performed, the connection between the uplink serving base station and the mobile station is released in a step 903.

The uplink target base station and the mobile station which complete the handover complete a network entrance/connection process including the ranging process if necessary and the uplink target base station allocates the uplink resource to the mobile station so as to transmit the data. The uplink target base station which newly becomes the uplink serving base station receives the uplink data (e.g., UL MAC PDU) from the mobile station in a step S904. Then, in a step S905, the uplink target base station which receives the uplink data transmits the acknowledgement signal for the received data, for example, the ACK signal to the downlink base station. Here, the downlink base station is the current downlink serving base station. That is, if the downlink handover to the downlink target base station is performed, the downlink target base station to which the handover is performed may become the downlink base station. In this case, the ACK signal is transmitted to the downlink base station having a good downlink channel status so as to increase a reception probability of the ACK signal.

If the base station which transmits the uplink data and the base station which receives the downlink data are different from each other, it is preferable that the ACK signal for the uplink data received by the uplink base station is transmitted to the base station which transmits the downlink data such that the base station which transmits the downlink data transmits the ACK signal to the mobile station.

In a step S906, the downlink base station receives the ACK signal for the uplink data from the uplink base station and sends the ACK signal to the mobile station. In particular, if the uplink base station and the downlink base station are included in the same diversity set, communication between the base stations can be appropriately performed and thus more excellent effect is obtained compared with a case where the uplink base station and the downlink base station are included in different diversity sets.

In a step S907, the mobile station which receives the ACK signal transmits new uplink data to the uplink base station. If a NON-ACK signal, that is, a NACK signal, is received, the transmitted uplink data may be retransmitted.

While the present invention has been particularly shown and described with reference to exemplary embodiments thereof, it will be understood by those skilled in the art that various changes in form and details may be made therein without departing from the spirit and scope of the present invention as defined by the appended claims.

That is, the present patent is not limited to the embodiments described herein and includes a widest range equivalent to principles and features disclosed herein.

[Industrial Applicability]

According to one embodiment of the present invention, a mobile station independently performs an uplink handover and a downlink handover such that a load applied to few base stations according to the amount or the type of uplink traffic or downlink traffic is distributed. In addition, if an uplink channel status and a downlink channel status between the base station and the mobile station are different from each other, the mobile station separately performs the handover so as to reduce packet loss when data is transmitted/received. The present invention is not limited to a specific system and is applicable to 3GPP LTE, IEEE 802.16e, IEEE 802.16m, and base stations, relay stations and mobile stations in various wireless communication systems with compatibility therewith.

The invention claimed is:

1. A method for performing an uplink handover and a downlink handover, the method comprising:
    acquiring information about a downlink channel status corresponding to a serving base station and at least one neighboring base station;
    receiving information about an uplink channel status corresponding to the serving base station and the at least one neighboring base station; and
    independently performing the downlink handover to a first base station of the at least one neighboring base station and the uplink handover to a second base station of the at least one neighboring base station based on the information about the downlink channel status and the information about the uplink channel status, respectively,
    wherein the first base station is for transmitting downlink data,
    wherein the second base station is for receiving uplink data, and
    wherein an acknowledgement signal acknowledging downlink data received from the first base station is transmitted to the second base station.

2. The method according to claim 1, further comprising:
    receiving uplink resource allocation information of the at least one neighboring base station from the serving base station; and
    transmitting an uplink signal to the second base station,
    wherein the uplink resource allocation information is coordinated between the serving base station and the at least one neighboring base station.

3. The method according to claim 1, wherein the acknowledgement signal acknowledging the downlink data is received by the second base station and is then transmitted from the second base station to the first base station.

4. The method according to claim 1, wherein the first base station and the second base station are included in a same diversity set.

5. The method according to claim 1, wherein an acknowledgement signal acknowledging uplink data received by the second base station is transmitted from the first base station.

6. The method according to claim 5, wherein the acknowledgement signal acknowledging the uplink data is transmitted from the second base station to the first base station before it is transmitted from the first base station.

* * * * *